Jan. 4, 1938.   C. D. PETERSON   2,104,669
FLEXIBLE CLUTCH SHAFT CONSTRUCTION FOR AUTOMOTIVE POWER PLANTS
Filed Oct. 17, 1935
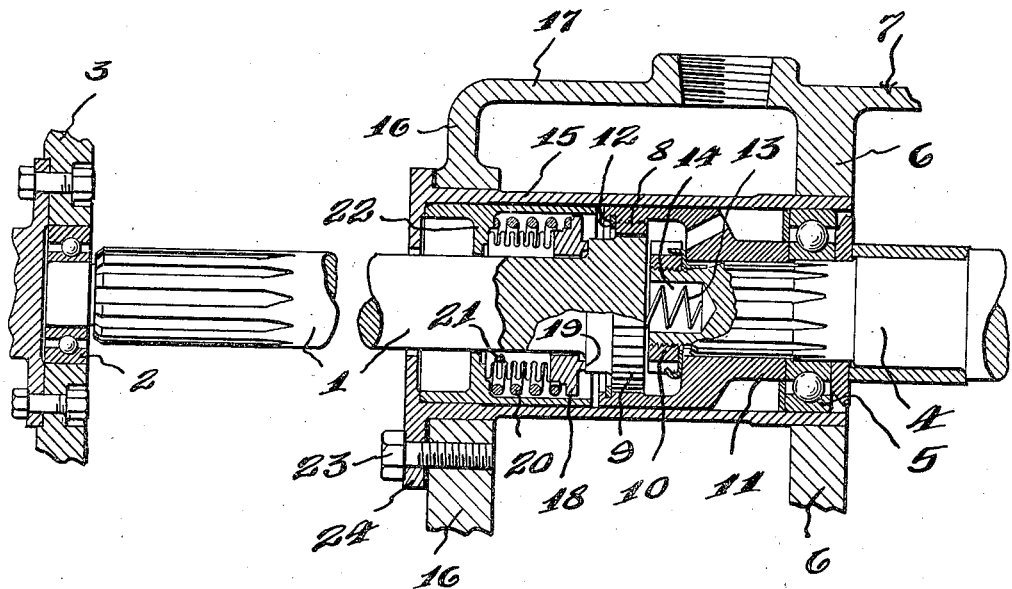
INVENTOR.
Carl D. Peterson
BY Bodell & Thompson
ATTORNEYS.

Patented Jan. 4, 1938

2,104,669

UNITED STATES PATENT OFFICE 2,104,669

FLEXIBLE CLUTCH SHAFT CONSTRUCTION FOR AUTOMOTIVE POWER PLANTS

Carl D. Peterson, Toledo, Ohio

Application October 17, 1935, Serial No. 45,463

2 Claims. (Cl. 64—9)

This invention relates to flexible shafts and particularly to a shaft construction for unit power plants for motor vehicles, where the transmission gear box is rigid with the bell or clutch housing, which, in turn is rigid with the fly wheel casing of the engine, and has for its object a coupling between the clutch shaft and the drive gear or stem gear of the transmission gearing, by which coupling sufficient flexibility is provided to compensate for slight misalinements, which may develop, or, which may be inherent in the assembly, it being understood that some misalinements are quite liable to occur, due to the fact that the abutting faces of the bell housing and the engine housing must be accurately faced off in planes at a right angle to the axis of the clutch shaft, in order to avoid misalinements and also that misalinements are liable to develop during the wear of the friction faces of the clutch and after refacing the disk of a clutch or when adjusting the clutch.

It further has for its object a particularly simple, economical and compact construction, whereby slight misalinements between the clutch shaft or clutch shaft section and the drive shaft of a transmission gearing, are compensated for.

In describing this invention, reference is had to the accompanying drawing which is a fragmentary longitudinal sectional view of a clutch shaft or clutch shaft section and the contiguous portion of the transmission gearing, fragmentary portions of the gear housing, and of the crankshaft and fly wheel of an engine being also shown.

This shaft construction comprises, generally, driving and driven sections arranged end to end and subject to slight misalinements, a coupling between the sections having universal joint action, one of the sections being journalled at one end to have a slight universal joint action and supported at its other end by the coupling, but being unsupported between its ends, so that there is a slight universal joint action at both ends of the shaft section. The drive shaft section is usually the clutch shaft of an automotive power plant.

The coupling comprises an internal clutch gear on one section and rigid therewith and an external clutch gear on the other section meshing throughout its circumference with the internal clutch gear, so that due to the clearances between gear teeth, a slight universal joint action is provided to compensate for misalinements.

I designates a shaft section, this being usually a clutch shaft which is mounted or journalled at its front end in a pilot bearing 2 mounted in the fly wheel 3 of the internal combustion engine of the power plant. It will be understood that there is a driven clutch section, including a friction plate or disk slidable axially of the shaft I into and out of engagement with a clutch face on the fly wheel and that the driven clutch section on the clutch shaft I is spring-pressed to press against the clutch face of the fly wheel evenly throughout the area of the friction surface of the driven clutch section. As the various forms of clutches are well known, description and illustration is thought to be unnecessary.

4 designates the driven shaft section, which is usually the drive shaft or stem of the stem gear of the transmission gearing of a motor vehicle. The stem gear is suitably journalled in an antifriction bearing 5 in the front wall 6 of the gear box 7. 8 and 9 designate respectively, the clutch gear sections, one of which is an internal clutch gear and the other an external gear.

In the illustrated embodiment of my invention, the internal gear 8 of the coupling is mounted on the end of the stem or shaft section 4 and extends through the wall 6 of the gear housing, and the external gear 9 is rigid with, and usually formed integral with, the clutch shaft section I at the rear end thereof. The internal clutch gear 8 is splined on or otherwise secured on the shaft section 4 and is secured in position by a lock nut 10. This clutch section 8 is provided with a hub 11 which thrusts against the inner ring or raceway of the bearing 5, which ring, in turn, is held from axial movement in any well known manner. Thus, the clutch section 8 is held from axial movement. The external gear clutch section 9 is located within the internal clutch gear 8 and held from outward displacement by an abutment or lock ring 12. A spring 13 is interposed between the confronting ends of the shaft sections 1, 4 and tends to thrust the shaft section I toward the lock ring or abutment 12, the spring 13 being located in a suitable axial recess 14 in the shaft section 4.

This coupling, consisting of clutch gears 8, 9, is housed within a sleeve 15 mounted at one end in the front wall 6 of the gear casing and at its other end in a wall 16 of an extension 17 of the gear housing. The internal clutch section 8 fits without frictional contact the interior of the sleeve 15. The shaft I is supported at its front end by the pilot bearing 2 and at its rear end by the coupling or by the section 8 thereof on the driven shaft 4 and is unsupported between the pilot bearing 2 and the coupling. A suitable oil tight joint is provided between the coupling and the shaft I, this consisting of a spring-pressed metal ring 18 around the shaft 1 and having an annular surface which presses at 19 against an annular metal surface on the shaft 1 or an enlargement thereof, the surfaces which engage at 19 being carefully lapped. The ring 18 is pressed axially to hold the surfaces engaged at 19 by a suitable spring 20 and also a sylphon or bellows 21 is interposed between the ring and an internal annular collar 22 on the sleeve. The sleeve is secured against displacement in any suitable manner, as by screws 23, extending through an annular flange 24 at the outer end thereof and into the wall 16 of the extension housing 17.

Owing to the clearances between the gear teeth of the clutch sections, a slight universal joint action is provided sufficient to compensate for any misalinements that may be inherently present or may develop between the shafts 1, 4 and crank shaft of the engine, and owing to the fact that the clutch shaft or shaft section 1 is mounted at both ends and has a slight universal joint action, all misalinements that may be inherent in, or may develop in, the clutch shaft are compensated for, thus eliminating strains on the clutch shaft and the shafts of the gearing, and hence eliminating gear noises due to slight misalinements in the gears or shafts.

It will be understood that a transmission gearing that is perfectly noiseless when tested, is oftentimes noisy when mounted on a chassis due to misalinements that have developed when assembled with the engine unit or with the chassis.

By this invention, all such misalinements are compensated for in a particularly simple and economical and compact construction.

What I claim is:—

1. In a power transmitting mechanism, the combination with the wall of a gear box having a journal bearing and a second wall spaced apart from the former wall, a sleeve supported between said walls concentric with the axis of said journal bearing, driving and driven shaft sections arranged end to end, the driving shaft section extending into the sleeve and being journalled at one end outside of the sleeve to have a slight universal joint action, the driven shaft section being journalled in said bearing and extending into the sleeve and having a head rotatably fitting the sleeve and formed with internal clutch teeth, the driving shaft having external clutch teeth meshing with the internal clutch teeth, the driving shaft section, which is journalled at one end to have a universal joint action, being supported at its other end solely by the engagement of the external clutch teeth with the internal clutch teeth of the head supported within the sleeve.

2. In a power transmitting mechanism, the combination with the wall of a gear box having a journal bearing and a second wall spaced apart from the former wall, a sleeve supported between said walls concentric with the axis of said journal bearing, driving and driven shaft sections arranged end to end, the driving shaft section extending into the sleeve and being journalled at one end outside of the sleeve to have a slight universal joint action, the driven shaft section being journalled in said bearing and extending into the sleeve and having a head rotatably fitting the sleeve and formed with internal clutch teeth, the driving shaft having external clutch teeth meshing with the internal clutch teeth, the driving shaft section, which is journalled at one end to have a universal joint action, being supported at its other end solely by the engagement of the external clutch teeth with the internal clutch teeth of the head supported within the sleeve, and a spring interposed between the abutting ends of the shafts and thrusting on the shafts in opposite directions, and an abutment for limiting the relative axial displacement of the shafts by the spring.

CARL D. PETERSON.